No. 661,908. Patented Nov. 13, 1900.
J. W. EVERICH.
CHURN DASHER.
(Application filed Mar. 16, 1900.)
(No Model.)
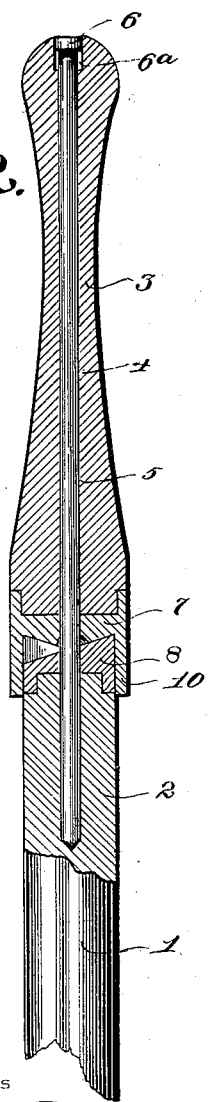
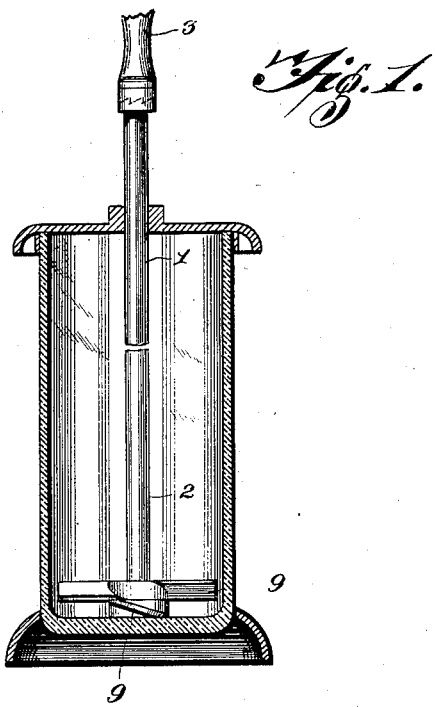
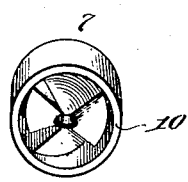
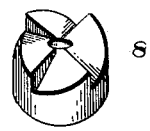
Witnesses
L. S. Dondero
H. H. Riley
J. W. Everich Inventor
By his Attorneys.
C. A. Snow & Co.

1
UNITED STATES PATENT OFFICE.

JOHN W. EVERICH, OF ANNAPOLIS, MARYLAND.

CHURN-DASHER.

SPECIFICATION forming part of Letters Patent No. 661,908, dated November 13, 1900.

Application filed March 16, 1900. Serial No. 8,930. (No model.)

*To all whom it may concern:*

Be it known that I, JOHN W. EVERICH, a citizen of the United States, residing at Annapolis, in the county of Anne Arundel and State of Maryland, have invented a new and useful Churn-Dasher, of which the following is a specification.

The invention relates to improvements in churn-dashers.

One object of the present invention is to improve the construction of that class of churn-dashers having oblique blades and adapted to rotate freely on the upstroke and held against such rotation on the downstroke. Heretofore the ratchet devices for causing the dasher to operate in this manner have been arranged either within the churn-body or on the cover thereof and have become clogged with the liquid contents during the operation of churning, and the greatest care is required in keeping them clean to prevent the cream from being discolored or otherwise injured through contact with such parts. It has also been found by experience that when a square dasher-rod is employed for guiding the dasher on the downstroke the cream is thrown from the angular corners of the dasher-rod when the same is rotated rapidly, which has not been overcome by the means provided for that purpose.

A further object of the invention is to locate the ratchet device outside of the churn-body and entirely beyond the same, and thereby absolutely prevent it from coming in contact with the cream during the operation of churning, and another object of the invention is to enable a round dasher-rod, which will not throw the cream when rotated rapidly, to be employed.

The invention consists in the construction and novel combination and arrangement of parts, hereinafter fully described, illustrated in the accompanying drawings, and pointed out in the claim hereto appended.

In the drawings, Figure 1 is a vertical sectional view of a churn provided with a dasher constructed in accordance with this invention, the dasher being shown in elevation. Fig. 2 is an enlarged sectional view of the upper portion of the dasher-rod. Figs. 3 and 4 are detail perspective views of the ratchet or clutch members.

Like numerals of reference designate corresponding parts in all the figures of the drawings.

1 designates a round dasher-rod composed of a lower rotary section 2 and an upper or handle section 3, which is shaped to form a handle or grip and which is adapted to be grasped by the operator. The sections 2 and 3, which may be connected in any desired manner that will admit of the free rotation of the lower section on the upstroke of the dasher, as hereinafter explained, are preferably secured together by means of a longitudinal rod 4, fixed at its lower end to the lower or rotary section 2 and extending through a central longitudinal bore 5 of the upper or handle section and provided at its upper end with a head 6. The head 6, which engages the handle-section 3 to limit the longitudinal movement of the sections, may be arranged in a recess $6^a$, forming an interior shoulder for contact with the head 6.

The rod, which forms a journal, is of sufficient length to permit a limited longitudinal movement of the upper and lower sections of the dasher-rod to permit upper and lower ratchet or clutch members 7 and 8 to be engaged with and disengaged from each other. The ratchet or clutch members, which are in the form of rings or ferrules, are constructed of suitable metal and are provided at their contiguous faces with ratchet-teeth, which are reversely arranged, as clearly illustrated in Fig. 2 of the accompanying drawings, to enable them to interlock and rigidly connect the upper and lower sections of the dasher-rod on the downstroke to hold the dasher-blades 9 against rotation. On the upstroke the lower section of the dasher-rod drops by gravity, and the sections are separated to enable the ratchet-teeth to clear each other, as clearly shown in Fig. 2, for permitting the lower section to rotate freely. The ratchet-teeth are concealed by an annular flange 10, formed integral with one of the ratchet or clutch members—preferably the upper one—and extending therefrom over the other ratchet or clutch member and covering the ratchet-teeth and the intervening space between the same when the sections of the dasher-rod are separated. The casing thus formed by the annular flange excludes dust from the ratchet or clutch and conceals the same and prevents all liability of the hand of the operator being pinched or caught between the sections. The sections of the clutch are provided at their outer ends with annular flanges forming sockets to receive the adjacent ends of the sections of the dasher-rod.

The blades 9, which are radially arranged, are disposed obliquely, and when the dasher is moved upward they rotate the lower section 2, which is round, to prevent cream from being thrown from it by such rotation. On the downstroke the ratchet or clutch members are engaged with each other, and they lock the upper and lower sections of the dasher-rod rigid with each other.

The invention has the following advantages: The upper and lower sections of the dasher-rod are interlocked on the downstroke by a ratchet or clutch which is located outside of the churn-body and a sufficient distance above the same to be entirely out of range of the cream, so that the latter cannot come in contact with the ratchet or clutch and neither can be affected by the other. It is unnecessary to clean the parts of the ratchet or clutch after each operation of the churn to avoid injuring the cream the next time the churn is operated; also, by employing a round dasher-rod cream is not thrown from the same by the rapid rotation thereof, and it is unnecessary to provide devices for collecting and returning such cream to the churn-body. It will also be apparent that the dasher is capable of effecting a rapid production of butter.

What is claimed is—

In a device of the class described, the combination of a churn-body, the dasher-rod composed of the long lower section projecting a considerable distance above the churn-body and the short handle-section having a longitudinal bore and provided with a recess at the upper end thereof, the clutch located at the lower end of the handle-section and interposed between both sections and composed of two members provided at their outer ends with sockets to receive the sections and having ratchet-teeth at their inner faces for engaging each other on the downstroke to lock the sections together, the upper member of the clutch being provided at its lower end with a depending annular flange extending over the ratchet-teeth and covering and concealing the inner ends of the members and forming a guard to prevent the hands of the operator from coming in contact with the teeth, and the rod extending through the bore of the handle-section and having its lower end embedded in the lower section of the dasher-rod, the upper end of the rod being provided with a head arranged in the recess of the upper end of the handle-section the latter being vertically movable on the rod, substantially as described.

In testimony that I claim the foregoing as my own I have hereto affixed my signature in the presence of two witnesses.

JOHN W. EVERICH.

Witnesses:
H. F. RILEY,
M. PERRY HAHN.